April 15, 1958 V. P. FLEISS 2,830,317
MEAT TENDERIZER
Filed Sept. 25, 1956

Victor P. Fleiss
INVENTOR.

2,830,317
MEAT TENDERIZER

Victor P. Fleiss, Lakewood, N. J.

Application September 25, 1956, Serial No. 611,887

5 Claims. (Cl. 17—25)

The present invention relates to certain new and useful improvements in a press-like machine or device which is characterized by raisable and lowerable means which functions to perforate a given product, for example a chunk or piece of meat which the user may desire to tenderize as a step preparatory to cooking the same.

More specifically, the invention is characterized by a simple, practical and reliable construction which is not intened to compress the meat but is such in construction that descending knife means perforates the piece of meat to leave a multiplicity of closely spaced holes therein, whereby the fibers and meat constituents are acted upon in such a way that effectual tenderizing results.

Another object, somewhat generally stated, is to improve upon and reduce the number of parts entering into the overall structural combination, thereby not only increasing the efficiency of the structure as an entity, but also rendering the same less costly to manufacture and to otherwise simplify the factors of assembling, repairs and replacements, sale and use.

A further object of the invention is to structurally, functionally and otherwise improve upon similarily constructed and performing devices and machines and, in so doing, to provide an efficient adaptation in which manufacturers will find their manufacturing requirements and economies satisfactorily met and users in butcher shops, restaurants and similar places will find their needs not only taken into account but effectually met.

Briefly summarized the improved tenderizer comprises a base plate, a top plate and a frame structure interconnecting said base and top plates, a head structure below said top plate and having operative association with said frame structure, elongated cutter elements depending from said head structure, a stripper plate associated with said frame structure and positioned below said head structure and having openings therethrough, said cutter elements extending through said openings, operating means operatively associated with said head structure and said top plate, and means operatively associated with said operating means and said frame for limiting movement between said head structure and said stripper plate.

Other objects, features and advantages will become more readily apparent from the following description and the accompanying sheet of illustrative, but not restrictive, drawings.

In the drawings, wherein like numerals are employed to designate like parts throughout the views.

Figures 1, 2, 3:
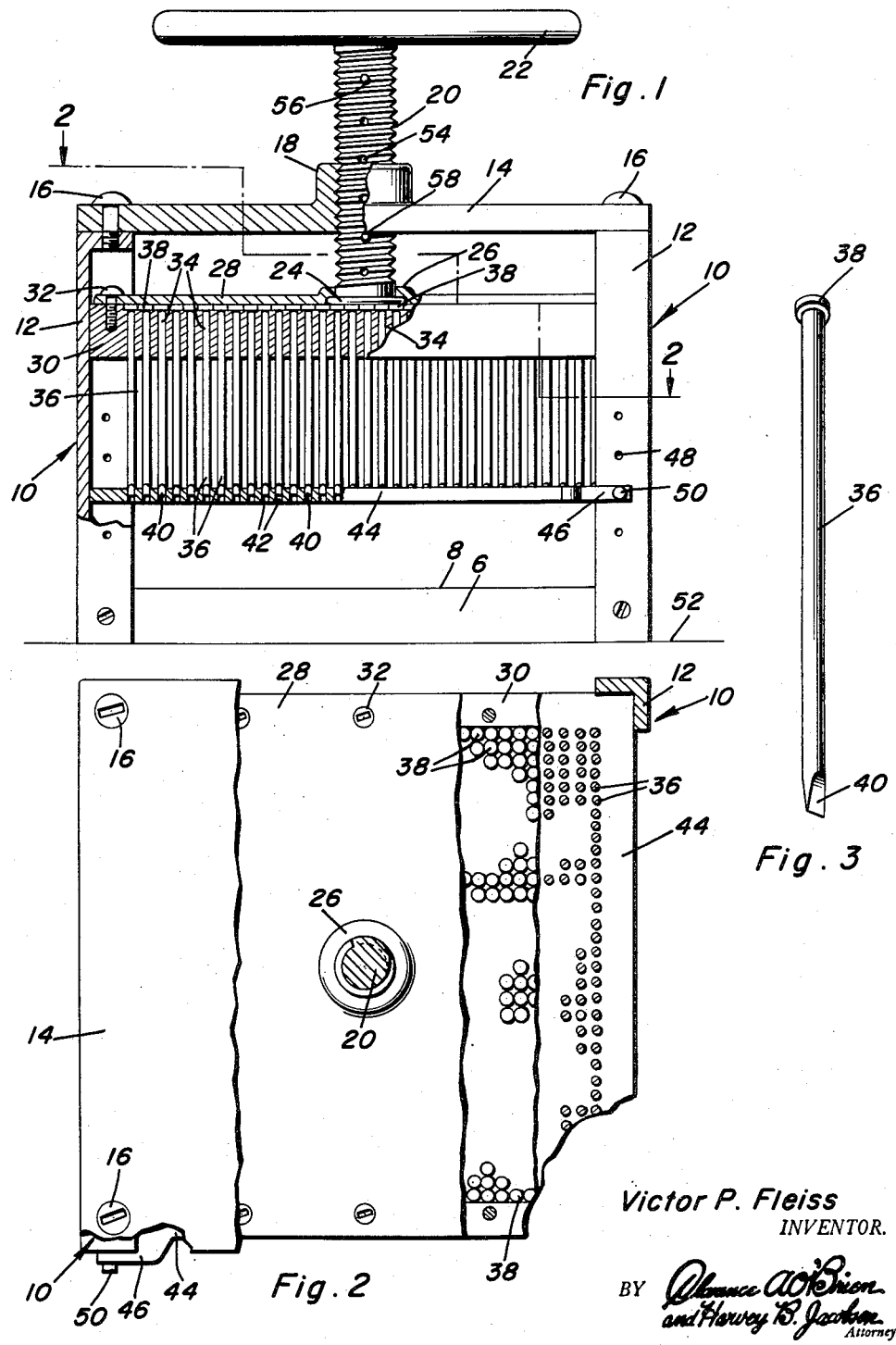
Fig. 1 is a view in section and in elevation of a meat tenderizer constructed in accordance with the invention and showing how it is constructed and approximately how it is used.
Fig. 2 is a view taken on the irregular line 2—2 of Fig. 1 looking in the direction of the arrows.
Fig. 3 is a perspective view of one of the cutter elements.

With reference now to the drawings the device or machine embodies a frame structure which is characterized at the lower portion by a plate-like rectangular or equivalent base 6. In actual practice this is preferably of wood and might perhaps be called a meat block. On its top surface 8 the meat product (not shown) is placed in a substantially obvious manner so that it may be penetrated and perforated. Attached to and rising from the corner portions of the base or block are uprights. These are denoted by the numerals 10 and preferably are in the form of stainless steel or equivalent non-corrodible vertically disposed angle irons, the flanges 12 of which satisfactorily accommodate the corner portions of the base 6 as shown in Figs. 1 and 2. There is a top plate 14 fastened atop the uprights as at 16. This is centrally apertured and provided with an upstanding collar 18 internally screw-threaded and forming what constitutes a feed nut. This nut serves to accommodate a vertically adjustable feed screw 20 having a hand wheel or any appropriate handle means 22 on its upper end. The lower end projects below the plane of the top plate 14 where, at 24, it is swively connected with a centrally apertured embossment 26 carried by a follower plate 28. The latter, in turn, is superimposed on a head plate 30 and fastened at the corner portions as at 32. The head plate is provided with a multiplicity of bores or passages 34 which accommodate a cluster of cutter elements. Each cutter element, sometimes referred to as a knife, takes the form of a pin 36. Actually the pin looks somewhat like a nail and has a head 38 on its upper end and the head is clamped between the top of the head plate 30 and the assembling and backing plate 28. It follows therefore that the knife assembly or cutter head comprises the head plate and backing plate which together follow up and down with the feed screw, in an obvious manner. The pins or cutter elements depending below the bottom of the plate 30 have their lower ends sharpened as at 40 and these sharpened cutter ends operate through perforations 42 formed in proper positions in the stripping plate 44. The stripping plate has lug-like extensions 46 at two or more corner portions which have adjustable or sliding contact with the adjacent flanges 12. In fact the proper flanges are provided with keeper holes 48 to accommodate insertible and removable keeper pins 50 which arrangement allows the stripper plate to be raised and lowered relative to the meat block 6.

It will be evident that the meat block or base 6 is fixed in the frame structure and is intended to rest atop a table or other stationary support surface 52. The stripper plate 44 is adjusted to approximately the thickness of the meat which is to be perforated and tenderized. Say for example, a chunk of meat some one inch in thickness is to be perforated. This is placed on the top surface 8 of the meat block and the stripper plate 44 is adjusted to a distance of approximately one inch above the surface 8. It is then secured by way of the cooperating lugs and keeper pins 50 and keeper holes 48 in an obvious manner. The perforations 42 in the stripper plate are such that the pointed and sharpened ends 40 of the pins or cutter elements are aligned therewith and project therethrough. This projection of the cutter ends through the holes 44 and into the meat serves, obviously, to penetrate the meat at a multiplicity of points. This is accomplished by simply screwing down the feed screw as a result of turning down the hand wheel 22. In other words the so-called press head goes down and carries the cutter pins down and the meat is punctured and then when the feed screw is backed up again the pins are withdrawn from the meat and also are withdrawn upwardly through the holes 42 again where they are concealed within the limits of the holes to avoid projection and possible unintended injury to the user. At the same time any clinging meat particles on the knife ends are stripped and the operation of the machine is kept clean and efficient. At times any of the parts may be dismantled for cleaning or repair as is obvious.

It will be noticed too that the feed screw is provided longitudinally with a plurality of holes 54. The holes above the nut serve to accommodate an insertible and removable stop pin 56 and a similar stop pin 58 is used to cooperate with the holes which are below the nut. Properly arranging and adjusting these stop pins the elevation of the cutter head to its return position may be adjusted and maintained by the stop pin 58. The downward movement of the cutter head with the cutter pins is limited by the pin 56 which checks itself against the nut 18 using the latter as a stop shoulder.

It is submitted that the invention herein disclosed constitutes a novel contribution to the art. It is of the utmost in simplicity and when constructed and used in the manner herein disclosed it results in providing a truly tenderized product, one which cooks in less time than would otherwise be the case and which, as a matter of fact, is more delicious and tastier than appears to be susceptible of accomplishment with tenderizers which are currently known and marketed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A meat tenderizer comprising a frame structure embodying a base plate, a top plate above said base plate and connected thereto in cooperative association by members of said frame structure, a head structure slidable within the confines of said frame structure toward and from said base plate and top plate, respectively, and having operative association with said frame structure, a stripper plate associated with said frame structure and positioned in said frame structure between the base plate and head structure and having a multiplicity of openings therethrough, a plurality of elongated cutter elements attached to and depending from said head structure, said cutter elements extending through said openings, operating means operatively associated with said head structure and also said top plate, and means operatively associated with said operating means and said frame structure for limiting movement between said head structure and said stripper plate.

2. The structure defined in claim 1, and wherein said movement limiting means embodies a manually regulatable stop carried by said operating means above said top plate and engageable with the top plate to limit the downward travel of the cutter elements, and at least one additional manual regulatable stop cooperatively associated with said heated structure whereby said cutter elements are also limited in upward travel relative to the stripper plate with the result that the cutter elements cannot objectionally withdraw from the openings in said stripper plate.

3. A meat tenderizer comprising a base plate, frame members attached to and rising from corner portions of said base plate, a top plate secured atop said frame members, a feed screw operatively associated with said top plate, a head structure slidably supported by said frame members, said feed screw being operatively connected to said head structure, a multiplicity of closely spaced cutter elements connected to and depending from said head structure toward said base plate, a stripper plate operatively and adjustably associated with said frame members and situated between said head structure and the base plate, means cooperatively associated with said stripper plate and frame members so that said stripper plate, when once it is adjusted and set for use, is stationary in a predetermined plane above said base plate, said stripper plate having openings therethrough, said cutter elements extending through said openings, and means operatively associated with said feed screw and top plate and head structure and base plate for limiting movement of said head structure relative to said stripper plate.

4. A meat tenderizer comprising a base plate, frame members attached to and rising from corner portions of said base plate, a top plate secured atop said frame members, a feed screw operatively associated with said top plate, a head structure slidably supported by said frame members, said feed screw being operatively connected to said head structure, a multiplicity of closely spaced cutter elements connected to and depending from said head structure toward said base plate, a stripper plate operatively and adjustably associated with said frame members and situated between said head structure and the base plate, means cooperatively associated with said stripper plate and frame members so that said stripper plate, when once it is adjusted and set for use, is stationary in a predetermined plane above said base plate, said stripper plate having openings therethrough, said cutter elements extending through said openings, a portion of said feed screw extending above said top plate and being provided with a plurality of stop pin holes, a first stop pin removably mounted in a selected one of said holes and engageable with said top plate to limit the downward travel of said cutter elements, a portion of said feed screw also extending beneath said top plate also having stop pin holes, and a second stop pin removably fitted into one of said last named stop pin holes to limit the upward travel of the feed screw when said second stop pin comes to rest against the top plate, whereby the cutter elements are prevented from withdrawal from the openings in said stripper plate.

5. A meat tenderizer comprising a frame structure embodying a base plate, uprights attached to and rising from corner portions of said base plate, a top plate paralleling said base plate and secured atop said uprights, a feed screw mounted centrally for operation on said top plate and provided with an operating member, a head structure movable in said frame structure toward and from the base plate and cooperatively associated with said uprights, said feed screw being operatively connected to said head structure, and said head structure embodying a multiplicity of depending cutter elements, a stripper plate adjustably and removably mounted on the uprights between said base plate and head structure, said stripper plate having openings therethrough, said cutter elements extending through said openings, and means operatively associated with said feed screw and head structure for limiting movement between said head structure and stripper plate.

References Cited in the file of this patent

UNITED STATES PATENTS

| 2,323,769 | Hansen | July 6, 1943 |
| 2,688,151 | Komarik et al. | Sept. 7, 1954 |

FOREIGN PATENTS

| 16,486 | Great Britain | 1903 |